UNITED STATES PATENT OFFICE.

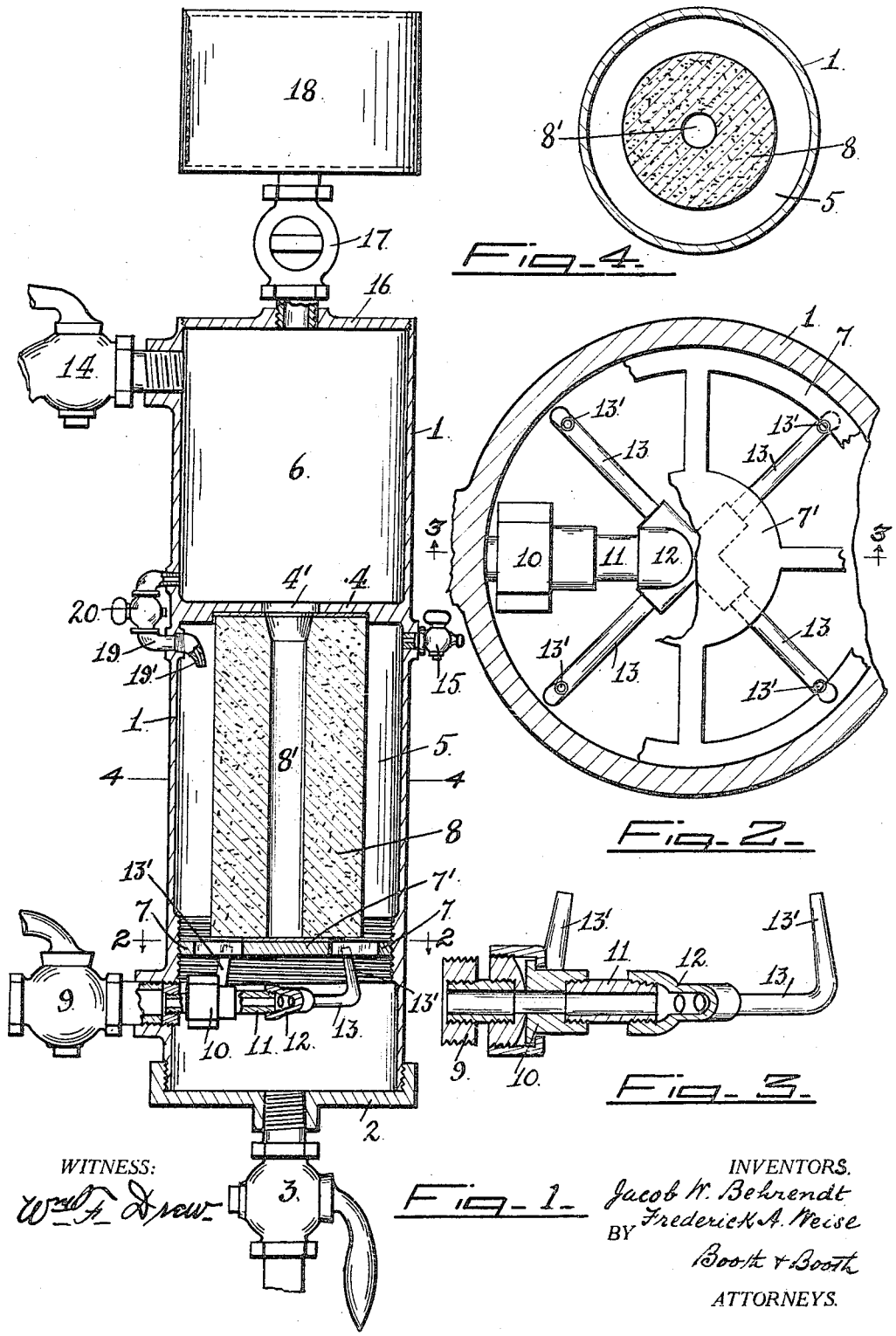

JACOB W. BEHRENDT AND FREDERICK A. WEISE, OF SAN FRANCISCO, CALIFORNIA.

FILTER.

1,256,766.  Specification of Letters Patent.  Patented Feb. 19, 1918.

Application filed March 6, 1917. Serial No. 152,484.

*To all whom it may concern:*

Be it known that we, JACOB W. BEHRENDT and FREDERICK A. WEISE, citizens of the United States, residing at the city and county of San Francisco and State of California, have invented certain new and useful Improvements in Filters, of which the following is a specification.

Our invention relates to the class of filters particularly for water for domestic use in residences, hotels, apartment-houses, restaurants and the like.

The prime objects of such filters should be cleanliness and capacity. These are the objects of our invention, and to this end our invention consists in the novel filter which we shall now fully describe, it being understood that we herein disclose the device in its preferred form, and that changes in construction and arrangement may be made without departing from the spirit and scope of our invention as defined in the claims hereunto appended.

In the accompanying drawings to which reference may be now had—

Figure 1 is a vertical section of our filter, partly in elevation.

Fig. 2 is a section, enlarged, taken on the line 2—2 of Fig. 1.

Fig. 3 is a section on the line 3—3 of Fig. 2.

Fig. 4 is a section on the line 4—4 of Fig. 1.

1 is a shell provided with a foot cap 2 having a cock controlled drain connection 3.

The shell is formed or provided with a centrally apertured partition 4, which divides it into a lower or filtering chamber 5 and an upper or filtered water chamber 6. Into the lower portion of the shell is screwed a skeleton ring 7, which serves as an adjustable support for the tubular filtering member 8, which, in practice, is a stone, such as is commonly used for the purpose, say, for example, filter clay. The upper end of the filter-stone is seated against the partition 4, and is firmly held by the adjustment of the supporting screw-ring 7. As will be seen the bore 8' of the filter-stone, at its lower end is closed by the solid center 7' of the screw-ring 7, while at its upper end it registers with the central aperture 4' of the partition, so that communication between the chambers 5 and 6 of the shell is had only through the pervious walls of the filter-stone 8.

9 is a cock-controlled inlet connection to the lower chamber 5 of the shell below the skeleton supporting-ring 7.

To the inner side of this inlet connection is fitted, by a suitable connection 10, an inlet nipple 11 to which is fitted, at its inner end, a distributing box 12, from which radiate a plurality of delivery spouts 13, the nozzles 13' of which pass up to the openings of the supporting ring 7, and are curved inwardly sufficiently to direct their issuing water jets upon the outer surface of the filter stone 8. The shell 1 is fitted with a bib-controlled outlet connection 14, from its filtered water chamber 6. This connection may be located at any desired point in said chamber, or there may be several such outlets fitted at various elevations. Where one only is used, as we have here shown, we prefer to locate it at the upper portion of the chamber.

15 is an air inlet pet-cock connection into the upper portion of the filtering chamber 5.

The upper end of the shell is fitted with a cap 16 to which is fitted by a cock-controlled connection 17 a compressed-air box 18.

Supplementing the spraying action of the inlet nozzles 13' at the lower portion of the filter-stone 8, we may, if found desirable, provide one or more spray pipes 19, leading from the lower portion of the upper chamber 6 into the upper portion of the filtering chamber 5, the nozzles 19' of said pipes being turned to direct their jets against the upper portion of the filter stone. These spray pipes are controlled by cocks 20.

The operation of the filter is as follows:—

All connections being closed and the filter empty except for the air it contains, the inlet connection 9 from the source of water supply is opened, and the connection 17 into the compressed air box 18 is also opened. The water entering under pressure is delivered through the spouts 13 into the filtering chamber 5 outside the filter stone 8. The water passes through the stone into its bore 8' and thence up into the filtered water chamber 6. Due to the pressure of the water the air in chamber 5 is driven through the stone into the water chamber 6 and thence the air from said chamber is forced into the box 18, in which it is compressed.

When the filtered water fills the chamber 6, the compressed air in the box 18 is cut off and confined therein by shutting off the cock-controlled connection 17.

In the construction of the filter regard is had to approximately proportioning the capacity of the air box 18 to that of the whole device and the pressure of the water, so that the water will fill the shell, thereby securing a full filtered water chamber. The device is now ready for use and filtered water may be drawn from the outlet connection 14. The shell 1 may be in whole or in part transparent in order to observe the interior stone.

When it is desired to clean the filter, as determined by the time it is in use, or by observation of the condition of its filter stone, the drain connection 3 of the shell is opened and the air pet-cock 15 is also opened. The water in the lower chamber 5 of the shell thereupon freely flows off. Then the connection 17 from the compressed-air box 18 is opened and simultaneously the water inlet 9 is opened sufficiently to cause water jets from the nozzles 13' to play on the exterior surface of the filter-stone 8. The compressed air now forces the water from chamber 6 back through the walls of the filter stone into the chamber 5. By this reversal of flow and the spraying of the exterior of the stone, the latter is cleansed, for it is a fact that impurities penetrate it but slightly, and mostly lie on the outer surface. If it be found desirable, a further spraying of the stone may be had by opening the pipes 19. It may be found in some cases that a sufficiently effective reversal of the flow may be had simply from the head of water in the shell without the use of the compressed air in the box 18, in which case the latter may be dispensed with.

We claim:—

1. A filter comprising a shell divided into communicating chambers; a filter-member interposed in the communication between the chambers; a controllable inlet connection to one of the chambers on one side of the filter-member; a controllable air-inlet into said chamber; a controllable drain therefrom; a controllable outlet connection from the other chamber; and means for directing water sprays on the surface of the filter-member when the drain connection is open, consisting of a distributing box fitted to the inlet connection, and a plurality of spouts radiating from said box, the nozzles of the spouts being directed toward the surface of the filter member.

2. A filter comprising a shell divided into communicating chambers; a filter-member interposed in the communication between the chambers; a controllable inlet connection to one of the chambers on one side of the filter-member; a controllable air-inlet into said chamber; a controllable drain therefrom; a controllable outlet connection from the other chamber; and means for directing water sprays on the surface of the filter-member when the drain connection is open, consisting of a spout connection fitted to the inlet connection, the nozzle of said spout connection being directed toward one portion of the filter member, and a controllable pipe connecting the two chambers, the nozzle of said pipe being directed toward another portion of the filter member.

3. A filter comprising a shell divided by an apertured partition into lineally disposed communicating chambers; a tubular filter-member fitted in one of said chambers, with one end seated against the partition and its bore registering with the aperture thereof; a ring adjustably fitted in said chamber, said ring bearing on the other end of the filter member to clamp it in place and to close its bore; a controllable inlet connection to the filter-member chamber outside of the filter member; a controllable air inlet into said filter member chamber outside of said filter member; a controllable drain from said chamber; and a controllable outlet connection from the other chamber.

4. A filter comprising a shell divided by an apertured partition into lineally disposed communicating chambers; a tubular filter-member fitted in one of said chambers, with one end seated against the partition and registering with the aperture thereof; a spider ring adjustably fitted in said chamber, the hub of said ring bearing on the other end of the filter member to clamp it in place and to close its bore; a controllable inlet connection to the filter-member chamber outside of the filter member and below the spider ring; a controllable air inlet into said filter member chamber outside of said filter member; a controllable drain from said chamber; a controllable outlet connection from the other chamber; and means for directing water sprays on the outer surface of said filter member when the drain connection is open, consisting of a distributing box fitted to the inlet connection, and a plurality of spouts radiating from said box, the nozzles of the spouts being directed into the spaces of the spider ring and toward the outer surface of the filter member.

5. A filter comprising a shell divided into lineally disposed communicating chambers; a tubular filter-member fitted in one of said chambers, with one end of its bore closed and the other registering with the communication between the two chambers; a controllable inlet connection to the filter-member chamber outside of the filter member; a controllable air inlet into said filter member chamber outside of said filter member; a controllable drain from said chamber; and a controllable outlet connection from the other chamber; means for directing water sprays on the surface of said filter member when the drain connection is open, consisting of a spout connection fitted to the inlet connection, the nozzle of said spout connection being directed toward the outer surface of the filter member at one end, and a controllable pipe connecting the two chambers, the nozzle of said pipe being directed toward the outer surface of the filter member at the other end.

6. A filter comprising a shell divided by an apertured partition into lineally disposed communicating chambers; a tubular filter member fitted in one of said chambers with one end seated against the partition and its bore registering with the aperture thereof; a skeleton ring adjustably fitted in said chamber, said ring bearing on the other end of the filter member to clamp it in place and to close its bore; a controllable inlet connection to the filter-member chamber outside of the filter member and below the skeleton ring; a controllable air inlet into said filter member chamber outside of said filter member; a controllable drain from said chamber; a controllable outlet connection from the other chamber; a compressed air box; a controllable communicating connection between said box and said other chamber; and means for directing water sprays on the outer surface of the filter member when the drain connection and the compressed air connection are open, consisting of a distributing box fitted to the inlet connection, and a plurality of spouts radiating from said box, the nozzles of the spouts being directed into the spaces of the skeleton ring and toward the outer surface of the filter member.

7. A filter comprising a shell divided into lineally disposed communicating chambers; a tubular filter member fitted in one of said chambers with one end of its bore closed and the other registering with the communication between the two chambers; a controllable inlet connection to the filter-member chamber outside of the filter member; a controllable air inlet into said filter member chamber outside of said filter member; a controllable drain from said chamber; a controllable outlet connection from the other chamber; a compressed air box; a controllable communicating connection between said box and said other chamber; and means for directing water sprays on the outer surface of the filter member when the drain connection and the compressed air connection are open, consisting of a spout connection fitted to the inlet connection, the nozzle of said spout connection being directed toward the outer surface of the filter member at one end, and a controllable pipe connecting the two chambers, the nozzle of said pipe being directed toward the outer surface of the filter member at the other end.

In testimony whereof we have signed our names to this specification in the presence of two subscribing witnesses.

JACOB W. BEHRENDT.
FREDERICK A. WEISE.

Witnesses:
WM. F. BOOTH,
D. B. RICHARDS.

Copies of this patent may be obtained for five cents each, by addressing the "Commissioner of Patents, Washington, D. C."